US009211705B2

(12) United States Patent
Chen et al.

(10) Patent No.: US 9,211,705 B2
(45) Date of Patent: Dec. 15, 2015

(54) PRINTER WITH PRINTHEAD ASSEMBLY, CLUTCH ASSEMBLY, AND PRINTER RIBBON TRANSPORT ASSEMBLY

(71) Applicant: ZIH Corp., Lincolnshire, IL (US)

(72) Inventors: Hsin-Chih Chen, Hsin-Chu (TW); Lawrence E. Smolenski, Newbury Park, CA (US); Petrica Dorinel Balcan, Thousand Oaks, CA (US); Jung Ethan Hoon Lee, Milwaukie, OR (US); Randal Wong, Camarillo, CA (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 14/509,152

(22) Filed: Oct. 8, 2014

(65) Prior Publication Data
US 2015/0151538 A1 Jun. 4, 2015

Related U.S. Application Data

(63) Continuation of application No. 13/284,540, filed on Oct. 28, 2011, now Pat. No. 8,882,371.

(60) Provisional application No. 61/407,654, filed on Oct. 28, 2010.

(51) Int. Cl.
*B41J 25/304* (2006.01)
*B41J 2/14* (2006.01)
(Continued)

(52) U.S. Cl.
CPC .. *B41J 2/14* (2013.01); *B41J 2/325* (2013.01); *B41J 2/3358* (2013.01); *B41J 25/304* (2013.01); *B41J 25/001* (2013.01); *B41J 25/316* (2013.01)

(58) Field of Classification Search
USPC ............................................. 400/224.2
See application file for complete search history.

(56) References Cited

U.S. PATENT DOCUMENTS 4,511,271 A      4/1985  Oberto
4,553,862 A  *  11/1985  Goldrian et al. ......... 400/120.16
(Continued)

FOREIGN PATENT DOCUMENTS

CN        1313197 A      9/2001
EP     0 219 252 A1      4/1987
(Continued)

OTHER PUBLICATIONS

Office Action from Australian Patent Application No. 2011320319 dated Apr. 10, 2014.
(Continued)

*Primary Examiner* — Jill Culler
(74) *Attorney, Agent, or Firm* — Alston & Bird LLP

(57) ABSTRACT

A printer may include a printhead assembly a clutch assembly, and/or a printer ribbon transport assembly. The printhead assembly may include a printhead biasing assembly defining a biasing ramp which may be configured to apply a biasing force to a printhead support bracket so as to at least partially counteract a ribbon force. The clutch assembly may be configured to supply or take-up a printer ribbon with first and second spool engagement members of different diameters that frictionally engage first and second friction members. The printer ribbon transport assembly may include a rotation lock mechanism configured to prevent rotation of a ribbon take-up core when the take-up core is disengaged from a drive assembly so as to prevent a loss in ribbon tension.

20 Claims, 13 Drawing Sheets

(51) Int. Cl.
*B41J 2/325* (2006.01)
*B41J 2/335* (2006.01)
*B41J 25/00* (2006.01)
*B41J 25/316* (2006.01)

(56) References Cited

U.S. PATENT DOCUMENTS

| | | | | |
|---|---|---|---|---|
| 4,605,323 | A | * | 8/1986 | Blanchard et al. ....... 400/124.27 |
| 4,607,967 | A | * | 8/1986 | Hirata et al. .................. 400/175 |
| 4,685,816 | A | * | 8/1987 | Mazumder et al. ........ 400/157.1 |
| 5,547,293 | A | | 8/1996 | Koch et al. |
| 5,595,447 | A | | 1/1997 | Takayama et al. |
| 5,788,387 | A | | 8/1998 | Takayama et al. |
| 6,224,276 | B1 | | 5/2001 | Funayama et al. |
| 6,386,774 | B1 | | 5/2002 | Takayama et al. |
| 6,637,957 | B2 | | 10/2003 | Mastinick |
| RE38,473 | E | | 3/2004 | Smolenski |
| 7,699,549 | B2 | | 4/2010 | Dochi et al. |
| 2002/0041782 | A1 | | 4/2002 | Mastinick et al. |
| 2002/0098025 | A1 | * | 7/2002 | Lee et al. ....................... 400/55 |

FOREIGN PATENT DOCUMENTS

| | | |
|---|---|---|
| EP | 0 593 269 A2 | 4/1994 |
| EP | 0 645 254 A2 | 3/1995 |
| EP | 1 052 107 A2 | 11/2000 |
| GB | 1 454 573 A | 11/1976 |
| GB | 2 340 567 A | 2/2000 |

OTHER PUBLICATIONS

Office Action from Australian Patent Application No. 2011320319 dated Jan. 28, 2015.
Office Action from Korean Patent Application No. 10-2013-7013659 dated Jun. 27, 2014.
Office Action from Korean Patent Application No. 10-2013-7013659 dated Dec. 16, 2014.
Office Action from Chinese Patent Application No. 201180062970.9 dated Dec. 1, 2014.

* cited by examiner

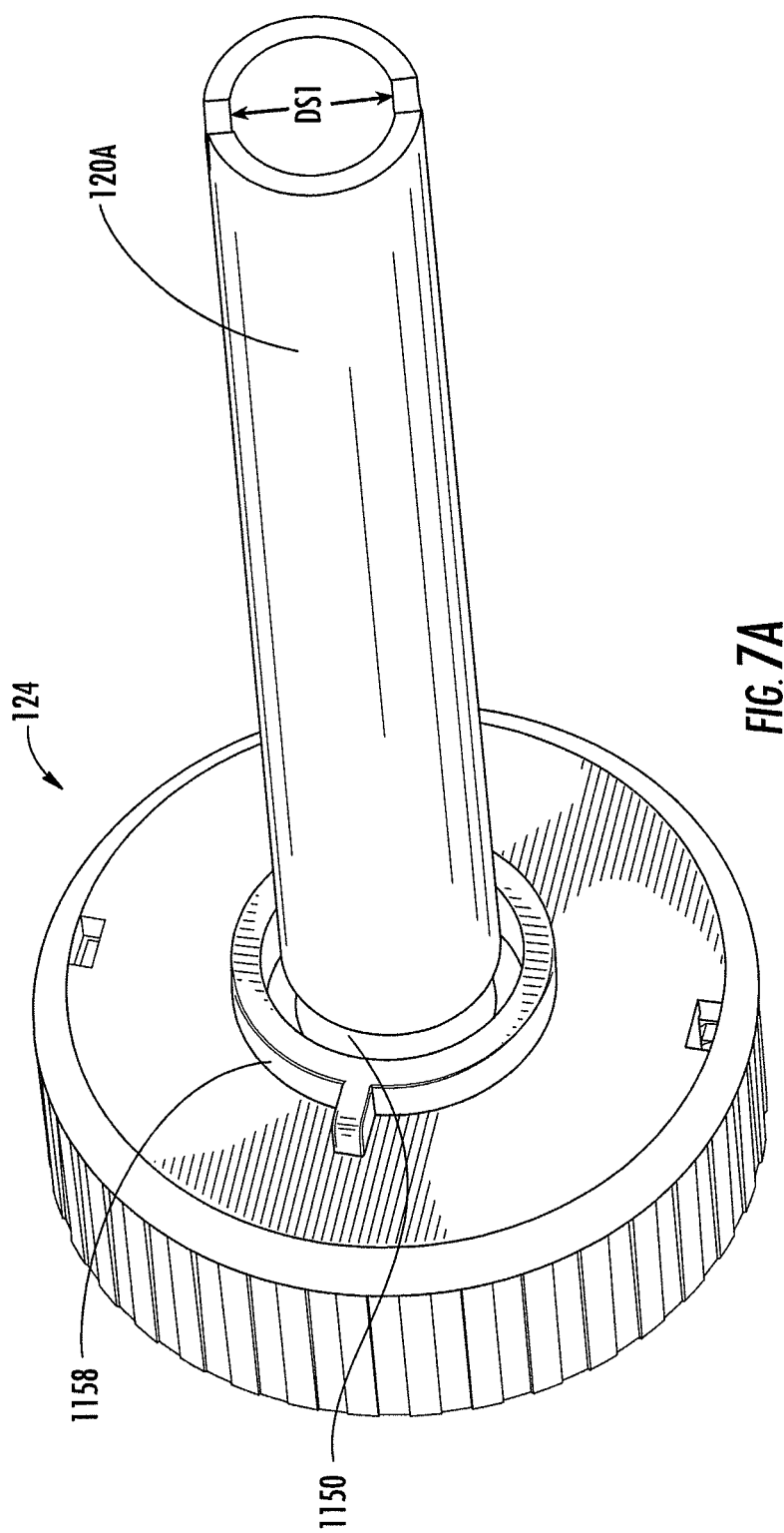

PRINTER WITH PRINTHEAD ASSEMBLY, CLUTCH ASSEMBLY, AND PRINTER RIBBON TRANSPORT ASSEMBLY

CROSS REFERENCE TO RELATED APPLICATIONS

This application is a continuation of U.S. Non-Provisional application Ser. No. 13/284,540, filed Oct. 28, 2011, now issued as U.S. Pat. No. 8,882,371, which claims the benefit of U.S. Provisional Application No. 61/407,654, filed Oct. 28, 2010, all of which are hereby incorporated by reference.

FIELD OF THE INVENTION

Embodiments of the invention relate to printers and assemblies incorporated into the same. For example, various embodiments of the invention relate to thermal transfer printers that are configured to print to labels or other media using an ink donor ribbon supply that is supported by ribbon clutch and transport assemblies, and a thermal transfer printhead assembly.

DESCRIPTION OF RELATED ART

Conventional thermal transfer printers include various components and assemblies such as a ribbon supply assembly, a ribbon take-up assembly, a media support assembly, a platen assembly, and a printhead assembly. During printing operations, the media is drawn from the media support assembly and ribbon is drawn from the ribbon supply assembly. Each of the ribbon and media are then fed through a nip defined between the printhead assembly and the platen assembly. Elements within the printhead assembly are heated to transfer ink from the donor ribbon to the media thereby creating printed indicia.

Applicant has identified a number of deficiencies and problems associated with the manufacture, use, operation, and maintenance of conventional thermal transfer printers. Through applied effort, ingenuity, and innovation, Applicant has solved many of these identified problems by developing a solution that is embodied by the present invention, which is described in detail below.

BRIEF SUMMARY OF THE INVENTION

Various embodiments of the present invention are directed to assemblies and components that are used in printers such as thermal transfer printers. More particularly, embodiments of invention are directed to a printer ribbon transport assembly, a clutch assembly usable with a print ribbon or other media, and a printhead assembly.

An example embodiment of the present invention may include a printhead assembly for use in a printing apparatus. The printhead assembly may include a printhead and a printhead support bracket. The printhead support bracket may include an opposed ramp surface configured for engagement by a biasing ramp of the printing apparatus and a ribbon peel surface configured to receive a ribbon force. The opposed ramp surface may be configured to receive a biasing force from the biasing ramp and the biasing force may at least partially counteract the ribbon force. The opposed ramp surface may define an angle of between 10 and 25 degrees relative to the major surface of the printhead support bracket.

Embodiments of the printing apparatus may also include a printhead biasing assembly including a printhead biasing element configured to bias the biasing ramp into contact with the opposed ramp surface of the printhead support bracket. The printhead biasing assembly may also include a guide member configured to guide the biasing ramp on a guide path. The guide path may be configured to direct the biasing ramp toward a platen. The biasing ramp may include a removable wedge. The printhead assembly may further include a heat sink, where the heat sink is coupled between the printhead and the printhead support bracket. The biasing assembly may be configured to bias the heat sink into contact with a stop member. The stop member may be defined by a base structure. The printhead assembly may be a replaceable component of the printing apparatus.

Embodiments of the present invention may provide a method of aligning a printhead. The method may include receiving a ribbon force at a peel surface of a printhead support bracket and generating a biasing force at the printhead support bracket to at least partially counteract the ribbon force. The biasing force may be directed by a biasing ramp of a biasing assembly engaging an opposed ramp surface of the printhead support bracket. The biasing force may be directed at an angle between 10 and 25 degrees relative to the printhead support bracket. The method may also include engaging a stop member with a heat sink coupled to the printhead. The method may still further include maintaining a substantially consistent ribbon force with a first clutch mechanism configured to engage a ribbon supply spool and a second clutch mechanism configured to engage a take-up spool. The method may also include guiding the biasing ramp on a guide path with a guide member of the biasing assembly. Optionally, the method may include directing the biasing ramp toward a platen with the guide member.

Example embodiments of the present invention may include a system for printing, including a printing apparatus configured to print on media, a printhead, and a printhead support bracket. The printhead support bracket may include an opposed ramp surface configured for engagement by a biasing ramp of the printing apparatus and a ribbon peel surface configured to receive a ribbon force. The opposed ramp surface may be configured to receive a biasing force from the biasing ramp, where the biasing force at least partially counteracts the ribbon force. The printing apparatus may include a printhead biasing assembly including a biasing element configured to bias the biasing ramp into contact with the opposed ramp surface of the printhead support bracket. The printhead biasing assembly may include a guide member configured to guide the biasing ramp on a guide path. The guide path may be configured to direct the biasing ramp toward a platen of the printing apparatus. The biasing ramp may include a removable wedge.

Example embodiments of the present invention may include a printer ribbon transport assembly. The printer ribbon transport assembly may comprise a take-up spool assembly having a take-up core that is configured to receive a ribbon, and wherein the take-up spool assembly is configurable between an engaged position and a disengaged position. The printer ribbon transport assembly may further comprise a drive assembly configured to drive the take-up spool assembly to rotate the take-up core in a first direction when the take-up spool assembly is disposed in the engaged position, and a rotation lock mechanism configured to prevent rotation of the take-up core in a second direction, which is opposite to the first direction, when the take-up spool assembly is disposed in the disengaged position. In one embodiment, the take-up spool assembly may comprise a take-up clutch assembly configured to bias the take-up core in the first direction.

In some embodiments, the rotation lock mechanism may comprise a ratchet assembly. The ratchet assembly may comprise a pawl configured to engage a toothed wheel that is rotationally connected to the take-up spool assembly. A spring or other biasing element may be configured to bias the pawl to engage the toothed wheel when the take-up spool assembly is in the disengaged position. The rotation lock mechanism may further comprise a lever arm coupled to the pawl and configured to cause the pawl to disengage from the toothed wheel when the take-up spool assembly is in the engaged position.

The printer ribbon transport assembly structured in accordance with various embodiments may further comprise a lever engagement surface, wherein the lever arm is configured to engage the lever engagement surface when the take-up spool assembly is in the engaged position. The rotation lock mechanism and the take-up spool assembly may be mounted to a lid, and the drive assembly may be mounted to the base structure. Further, the base structure may define the lever engagement surface, and the lever arm may be configured to release from the lever engagement surface when the take-up spool assembly is in the disengaged position.

Still other embodiments are directed to a clutch assembly comprising a first spool engagement member defining a first diameter and a first friction member configured to frictionally engage the first spool engagement member. A second spool engagement member may define a second diameter that is larger than the first diameter. Further, the clutch assembly may include a second friction member configured to frictionally engage the second spool engagement member.

Still further embodiments of the present invention are directed to a clutch assembly comprising a first spool engagement member defining a first friction torque and a first friction member configured to frictionally engage the first spool engagement member. A second spool engagement member may define a second friction torque that is larger than the first friction torque. Further, the clutch assembly may include a second friction member configured to frictionally engage the second spool engagement member.

In some embodiments the clutch assembly may further comprise a biasing assembly configured to bias the first spool engagement member into contact with the first friction member and bias the first friction member into contact with the second friction member. Further, the second spool engagement member may be configured to couple to the first friction member. The first friction member may comprise an integral member in some embodiments. In other embodiments the first friction member may comprise a friction plate and a coupling plate keyed thereto, wherein the coupling plate is configured to couple the friction plate to the second spool engagement member.

In some embodiments the clutch assembly may be configured to take-up a ribbon. In such embodiments the clutch assembly may further comprise a driven member configured to rotationally engage a drive assembly and further configured to engage a coupler. Further, a biasing element such as a spring may be coupled to the coupler and the second friction member. Rotation of the drive assembly may be configured to rotate the driven member so as to impart a rotational force to the second friction member and thereby cause the second friction member to rotate. Thereby, rotation of the second friction member may be configured to cause the first friction member to rotate via frictional engagement, and rotation of the first friction member may be configured to cause the first spool engagement member to rotate via frictional engagement. Also, rotation of the first friction member may be configured to rotate the second spool engagement member via coupling there between.

In other embodiments the clutch assembly is configured to supply a ribbon. In such embodiments the first friction member may be configured to rotate when the first spool engagement member rotates via frictional engagement there between and further configured to rotate when the second spool engagement member rotates via coupling there between. Also, the first friction member may be configured to rotate the second friction member via frictional engagement there between. The clutch assembly may further comprise a coupler configured to couple to the second friction member through a biasing element such as a spring, wherein the coupler is configured to couple to a stationary member. Thereby, rotation of the second friction member may be configured to rotate the biasing element via coupling there between, and the biasing element may be configured to resist movement of the second friction member via coupling to the stationary member though the coupler.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 7A illustrates a perspective view of the ribbon take-up clutch of FIG. 7 with a ribbon take-up core attached to a first spool engagement member according to an embodiment of the invention;

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
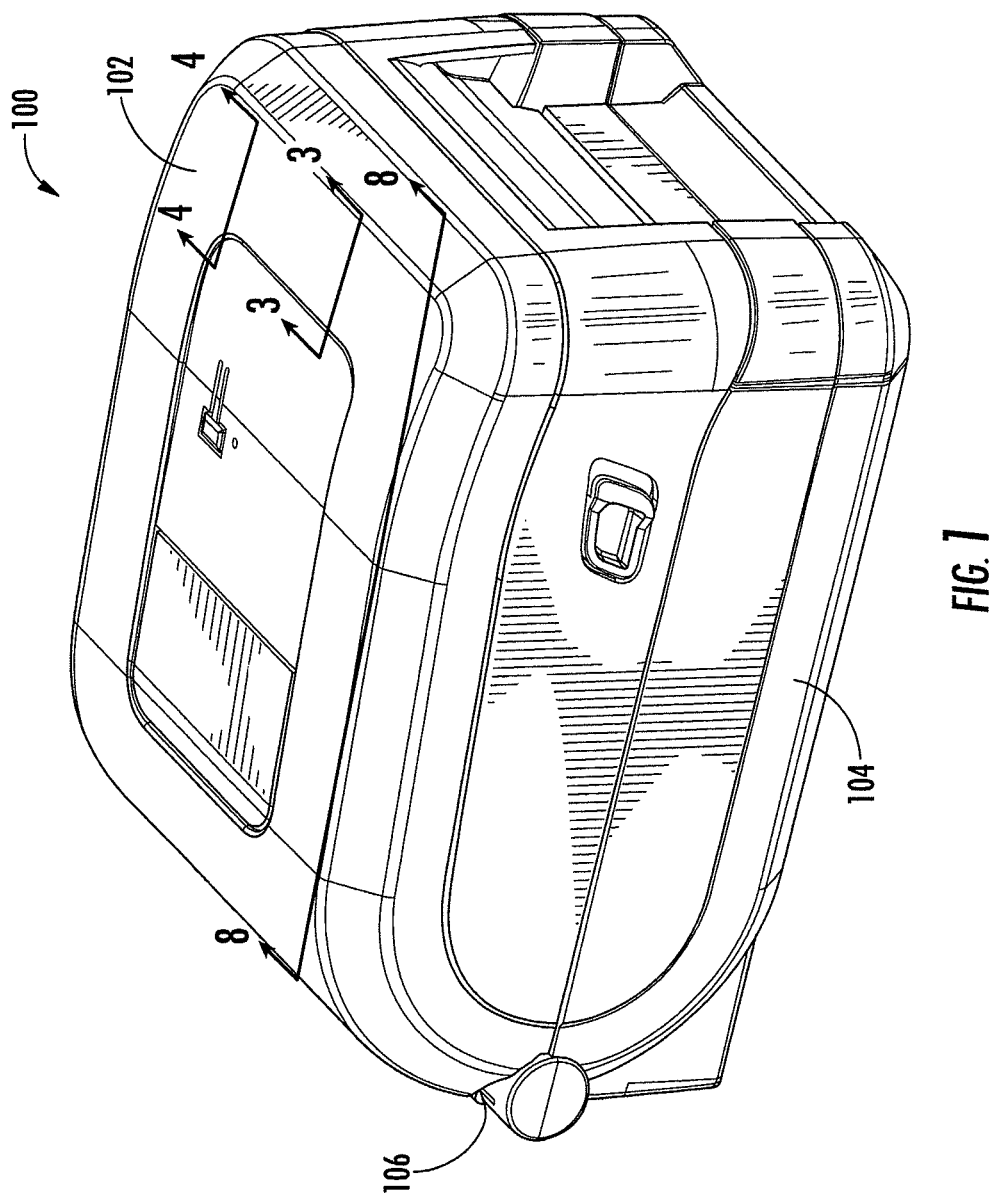
FIG. 1 illustrates a perspective view of a printer structured according to various embodiments of the invention.

FIG. 1 illustrates a perspective view of a printer 100 according to an example embodiment of the invention. The printer 100 may include a variety of components and assemblies configured to facilitate printing on a print media. In some embodiments the print media may comprise labels that are releasably adhered to a carrier media. Thereby, for example, a spool of print media may be employed to support such labels as needed. In some embodiments, the printer 100 may employ a ribbon (e.g., an ink donor or thermal transfer ribbon) to print on the print media. For example, the printer 100 may be a thermal transfer printer that selectively heats the ribbon using a printhead in order to transfer ink from the ribbon to the print media.

Various embodiments are directed to a printer 100 comprising a number of features configured to facilitate printing. The depicted printer 100 comprises a lid 102 and a base structure 104. The base structure 104, as used herein, may refer to the bottom portion or frame of the printer 100 below the lid 102 as well as various internal structures that support the components of the printer. The lid 102 may be configured to pivot via a hinge 106 or other mechanism so as to allow a user to access internal components of the printer 100. For example, a user may be able to replace the ribbon, the print media, and other consumable supplies as needed.

Figure 2:
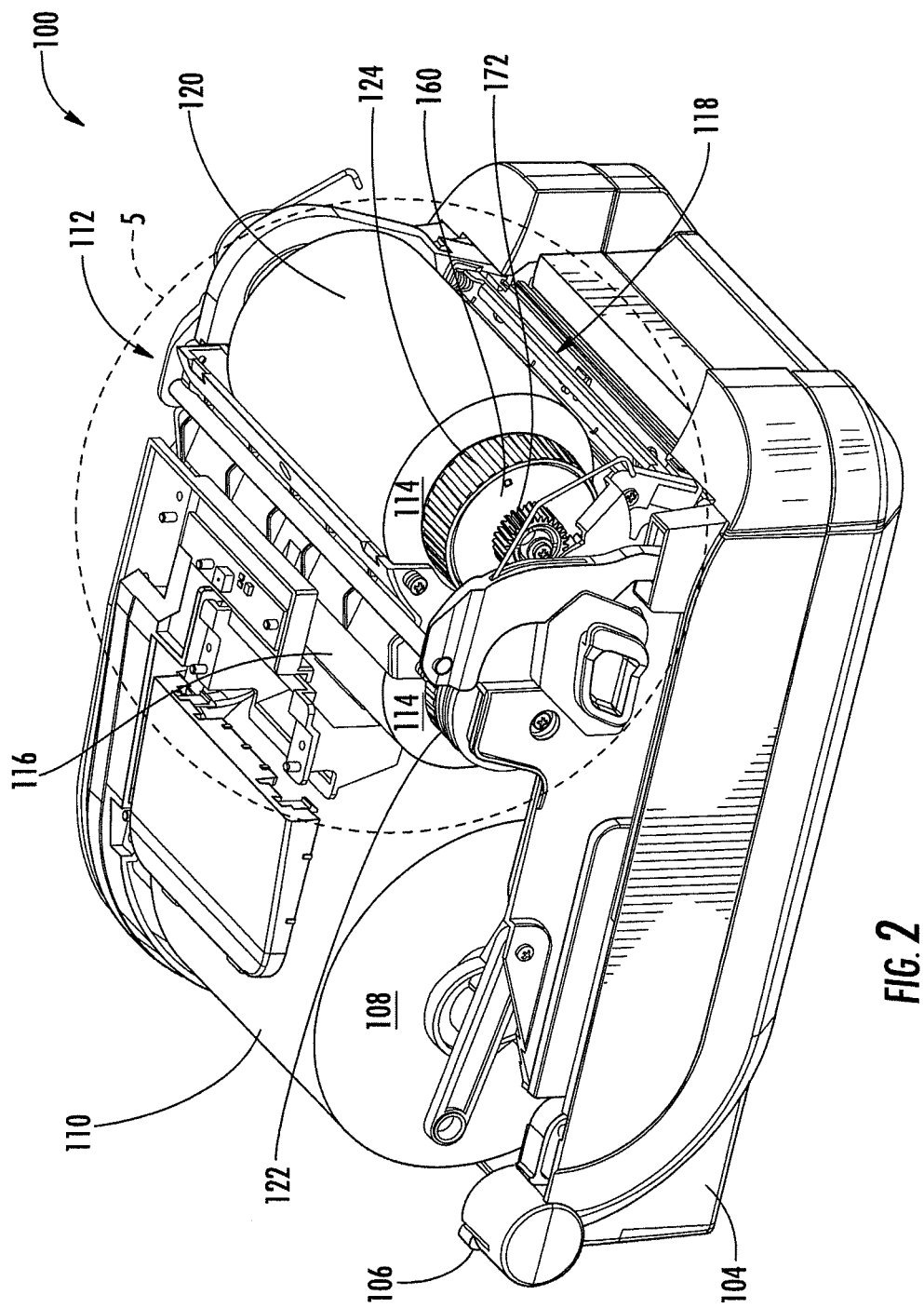
FIG. 2 illustrates a perspective view of the printer of FIG. 1 with a lid removed for illustration purposes.

FIG. 2 illustrates a perspective view of the printer 100 with the lid 102 removed in order to illustrate internal components therein. As illustrated, the printer 100 may be configured to receive print media 108, which may be stored on a print media spool 110, although various other configurations and types of print media may be employed in other embodiments that may not be supported by a spool as may be appreciated by one of ordinary skill in the art (e.g., folding media, stacked media, etc.). A printer ribbon transport assembly 112 may in some embodiments comprise a ribbon supply spool 116, a ribbon take-up spool 120, a ribbon supply clutch assembly 122, a ribbon take-up clutch assembly 124, and a driven member 170 (driven by drive assembly 172 shown in FIG. 8 and described further below). The printer ribbon transport assembly 112 may be configured to direct a ribbon 114 from the ribbon supply spool 116 over or through a printhead assembly 118 to the ribbon take-up spool 120. The ribbon take-up spool 120 may comprise a ribbon take-up core 120A, 120B (see, e.g., FIGS. 7A and 7B) on which the ribbon 114 is received. The ribbon supply clutch assembly 122 and the ribbon take-up clutch assembly 124 may be configured to improve movement of the ribbon 114 and, thus, improve printer performance, as will be described below.

Printhead Biasing Assembly

Figure 3:
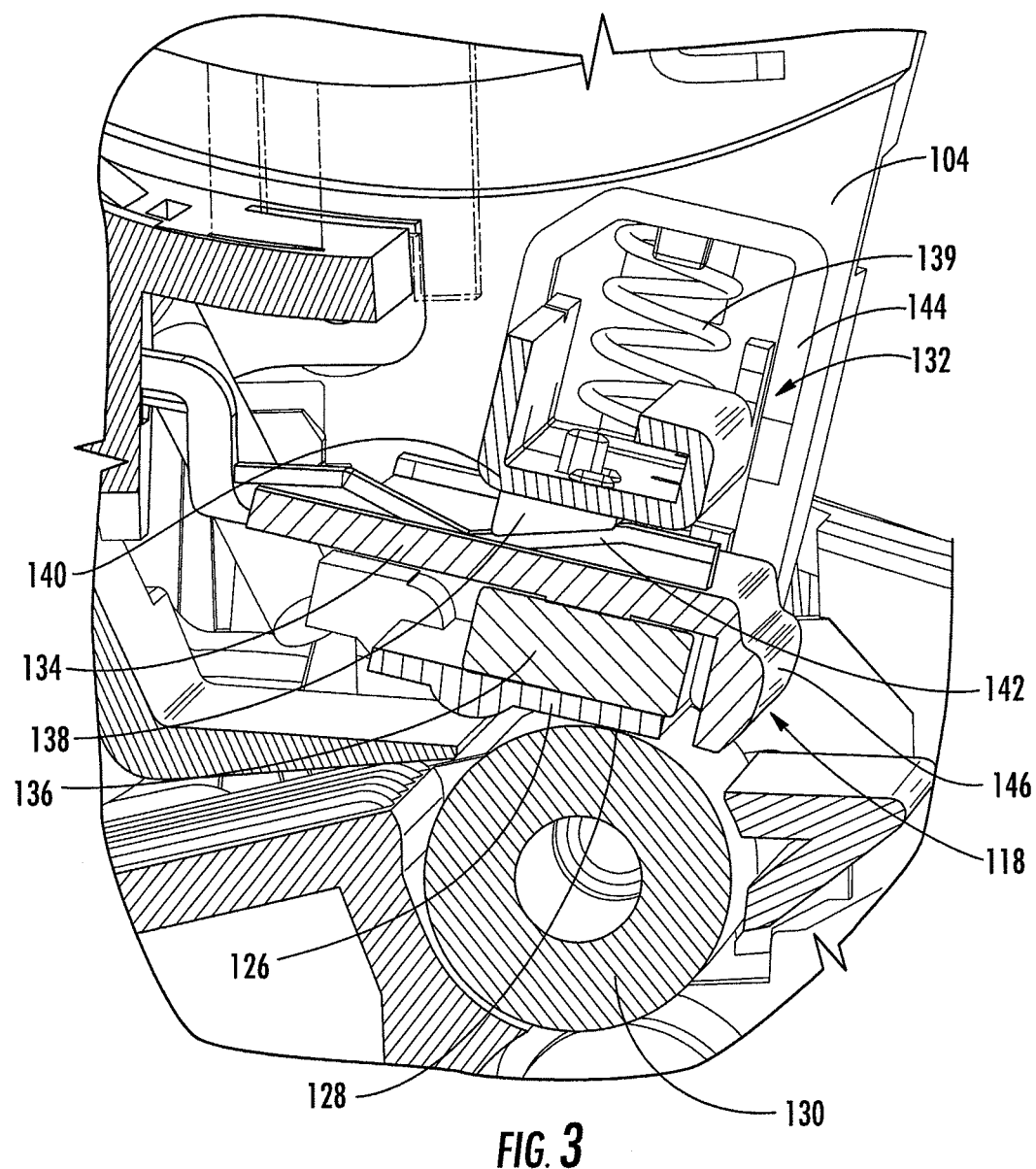
FIG. 3 illustrates an enlarged section and perspective view of a printhead assembly structured in accordance with embodiments of the invention, taken along section line 3-3 of FIG. 1.

As mentioned above, ink from the ribbon 114 may be transferred onto the print media 108 using a printhead assembly 118. Details concerning a printhead assembly 118 structured in accordance with one embodiment are illustrated in FIG. 3. The depicted printhead assembly 118 may comprise a printhead 126, a platen 130, a printhead biasing assembly 132, and a printhead support bracket 134. The printhead 126 may in one embodiment, as further illustrated in FIG. 3A, be configured to heat the ribbon 114 so as to transfer ink from the ribbon to the print media 108. In this regard, from the perspective shown, the ribbon 114 and print media 108 may travel generally from the left to right and enter a nip 128 formed between the printhead 126 and the platen 130. The platen 130 may be driven (i.e., driven to rotate by a motor or other drive means) in some embodiments so as to pull the print media 108 through the nip 128. Further, as will be discussed below, the ribbon take-up spool 120 may also be driven so as to pull the ribbon 114 from the ribbon supply spool 116 through the nip 128 and onto the ribbon take-up spool 120, where the used ribbon is collected. In still another embodiment, the ribbon take-up spool 120 and the ribbon supply spool 116 may each be driven with the ribbon take-up spool 120 having a relatively greater drive force and/or velocity when compared to the ribbon supply spool 116 so as to ensure that appropriate tension is applied to the ribbon.

The printhead biasing assembly 132 may be configured to bias the printhead 126 into a desired position with respect to the platen 130. The depicted printhead biasing assembly 132 comprises a biasing element in the form of a spring 139, a biasing member 140, and a biasing ramp 138 extending from the biasing member 140. The depicted biasing ramp 138 defines a wedge that is attached to a biasing member 140. However, in other embodiments, the biasing ramp 138 may be integrally formed with the biasing member 140 and, thus, define a single-piece unit.

In some embodiments, the printhead 126 may be supported by a printhead support bracket 134. The depicted printhead 126 is configured to attach to the printhead support bracket 134 via a heat sink 136. In one embodiment, the printhead support bracket 134 defines an opposed ramp 142, which is also generally wedge shaped, that is positioned for engagement by the biasing ramp 138 of the printhead biasing assembly 132.

The spring 139 of the printhead biasing assembly 132 is configured to bias the biasing ramp 138 into contact with the opposed ramp 142 of the printhead support bracket 134. In some embodiments, the printhead assembly 118 may further comprise a guide member 144 configured to guide the biasing ramp 138 and the printhead biasing assembly 132 on a guide path. The guide member 144 may comprise part of the base structure 104 and/or printer frame structure in some embodiments. For example, in the illustrated embodiment, the guide member 144 is formed as a slot is disposed within a frame member extending from the base structure 104; however, the guide member 144 does not necessarily contact the biasing ramp 138 directly. For example, the biasing ramp 138 may be arranged on a carrier, such as biasing member 140, which is guided within the guide member 144. Further, the direction with which the biasing member 140 is biased may be generally in the direction of the platen roller 130 to generate a biasing force of the printhead 126 against the platen roller 130 along nip 128. This biasing force, together with the biasing ramp 138 and the opposed ramp 142 bias the printhead 126 generally toward the platen roller 130 and forward along the media path, toward the bullnose 146.

Figure 3A:
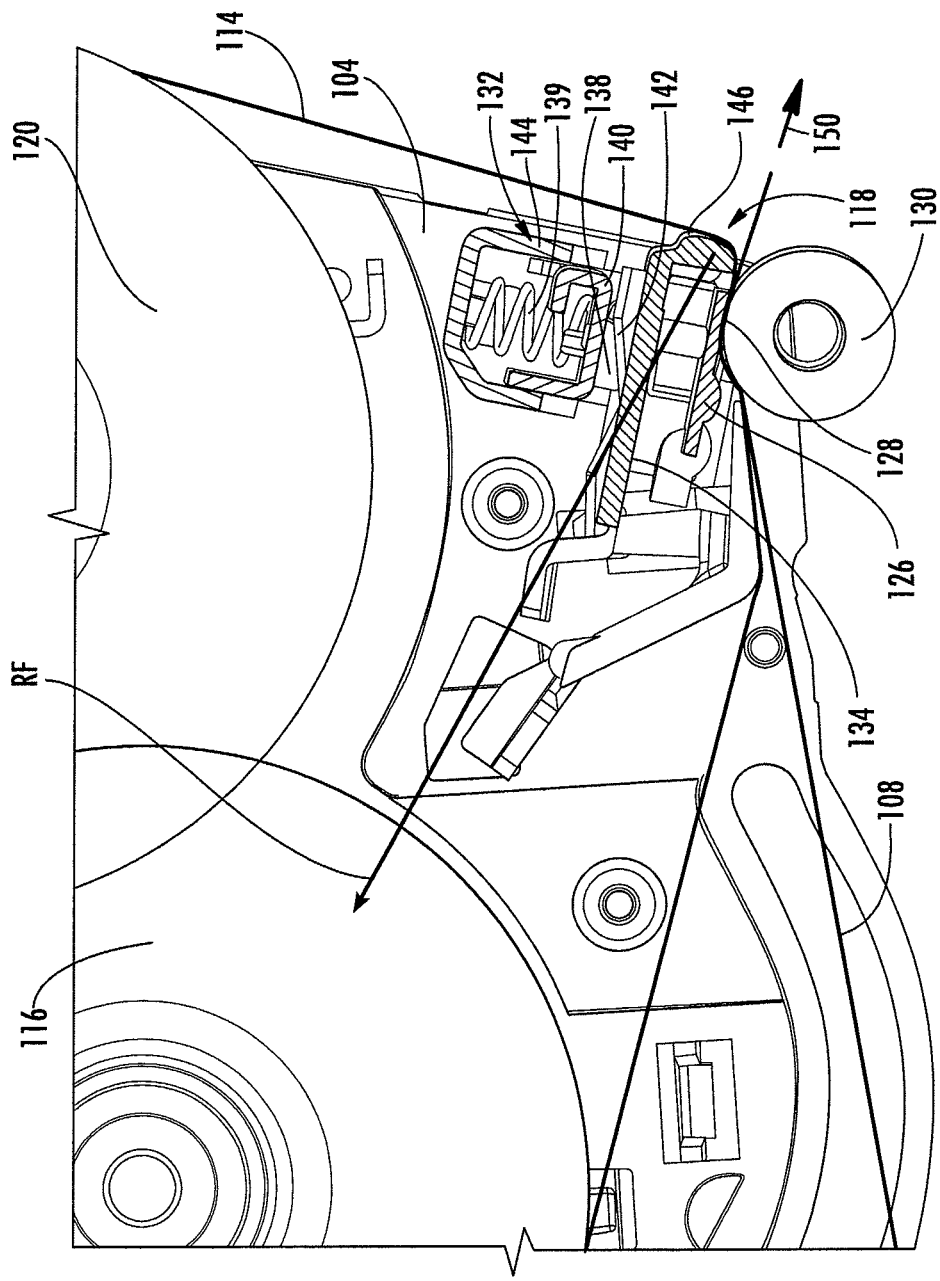
FIG. 3A illustrates an enlarged partial sectional view of a printer ribbon path extending through a printhead assembly structured in accordance with embodiments of the invention, taken along section line 3-3 of FIG. 1.

The biasing ramp 138 of the printhead biasing assembly 132 may be configured to apply a biasing force to the printhead support bracket 134 through the opposed ramp 142. The biasing force, in some embodiments, may have at least two components, i.e., a first or downward component that operates to drive the printhead 126 downwardly into the platen 130, and a second or lateral component that operates to drive the printhead support bracket 134 generally forwardly against an applied ribbon force RF, which is illustrated in FIG. 3A. As will be appreciated by one of ordinary skill in the art, the ramp may be a block, wedge, or other complex shape that directs the biasing force in a direction that substantially opposes the applied ribbon force RF.

FIG. 3A is a detail view of the path of a ribbon 114 through the printhead assembly 118 of a printer structured in accordance with various embodiments of the invention. The ribbon 114 is drawn from the ribbon supply spool 116 between the nip 128 defined by the printhead 126 and the platen 130, over a bullnose or ribbon peel surface 146 defined by the printhead support bracket 134, and returned upwardly to the ribbon take-up spool 120. As will be appreciated by one of skill in the art in view of this disclosure, tension in the ribbon 114 may tend to apply a ribbon force RF to a ribbon peel surface 146 of the printhead support bracket 134. This force may tend to pull the ribbon support bracket 134 upwardly and back generally in a direction illustrated by arrow RF in FIG. 3A. In "floating printhead" applications where the position of the printhead 126 is not rigidly fixed, such a ribbon force RF can cause misalignment of the printhead 126 and poor print quality.

In various embodiments, the downwardly biased wedge shape of the biasing ramp 138 tends to drive the printhead support bracket 134 generally forwardly (along the media feed path 150) through engagement with the opposed ramp 142. In this regard, the printhead 126 is maintained in a proper print position despite application of the ribbon force RF to the printhead support bracket 134. Said differently, in some embodiments, the biasing ramp 138 of the printhead biasing assembly 132 may be configured to apply a biasing force to the printhead support bracket 134 through the opposed ramp 142 that at least partially counteracts the ribbon force RF applied by the ribbon 114 to the ribbon peel surface 146.

The biasing ramp 138 and the opposed ramp 142 may each define engagement angles between about 10 and 25 degrees relative to the major surface the printhead support bracket. The angles defined by the biasing ramp 138 (e.g., the biasing ramp angle) and the opposed ramp 142 (e.g., the opposed ramp angle) may be selected so as to cause the lateral component of the biasing force to be directed in a direction so as to at least partially overcome the ribbon force RF. For example, when the biasing ramp 138 and the opposed ramp 142 define relatively small angles (i.e., less than 15 degrees), the biasing force may be directed more towards the platen 130, whereas relatively sharper angles for the biasing ramp angle and the opposed ramp angle (i.e., 30 to 45 degrees) may direct the lateral component of the biasing force to drive the printhead support bracket 134 generally towards the ribbon peel surface 146, substantially along the media feed path 150.

The biasing ramp 138 and the opposing ramp surface 142 may be located proximate a mid-point of the printhead support bracket along the print line defined between the printhead and the platen roller. Positioning the biasing ramp and opposing ramp surface proximate the mid-point of the printhead support bracket may provide an evenly distributed biasing force against the printhead support bracket along its width. Further, when using center-justified media, positioning the biasing ramp 138 and opposing ramp surface 142 proximate the mid-point may promote an evenly distributed biasing force along the print-line. A further benefit of situating the biasing ramp and the opposing ramp surface proximate the mid-point of the printhead support bracket may be to permit wire-harness connections to the printhead on both ends of the printhead. Wire harness connections at both ends of the printhead may allow for the printhead to receive print data from either side, which may be beneficial in resistive printheads where the voltage drop increases along the length of the printhead away from the harness connector. Wire harness connections at both ends of a printhead may also be beneficial as any force applied to the printhead via tension of the wire harness may be evenly distributed to both sides of the printhead, thereby better maintaining alignment of the printhead with the platen roller.

Figure 4:
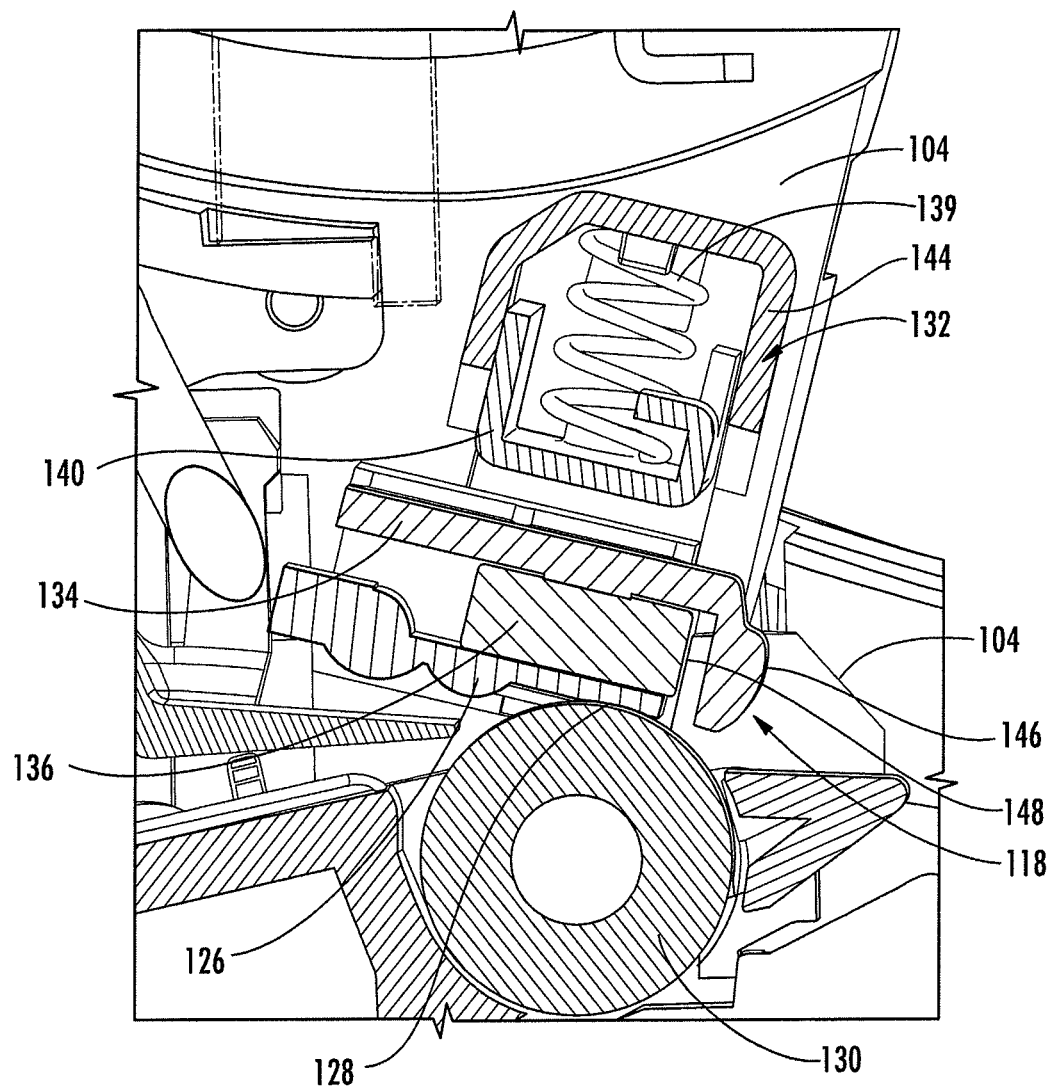
FIG. 4 illustrates an enlarged sectional view of a printhead assembly having a stop member according to one embodiment of the invention, taken along section line 4-4 of FIG. 1.

As illustrated in FIG. 4, in some embodiments, the printhead biasing assembly 132 may be configured to bias a heat sink 136 into contact with a stop member 148 to better align the printhead 126 for printing. The stop member 148 may be configured to preclude the floating printhead assembly from advancing any further along the media feed path 150. Contact may be achieved and maintained between the stop member and the printhead assembly in order to maintain a consistent alignment of the printhead relative to the platen. The heat sink 136 is coupled to the printhead 126 in order to more efficiently dissipate heat generated at the printhead, thereby cooling the printhead 126 and generally increasing print speed and quality. The printhead assembly 118 may be a "floating printhead" assembly having alignment features similar to those disclosed in U.S. patent No. RE 38,473, which was reissued on Mar. 23, 2004 and is commonly assigned to the present Applicant, i.e., ZIH Corp. U.S. patent No. RE 38,473 is hereby incorporated by reference in its entirety.

Dual Clutch Mechanism

Figure 5:
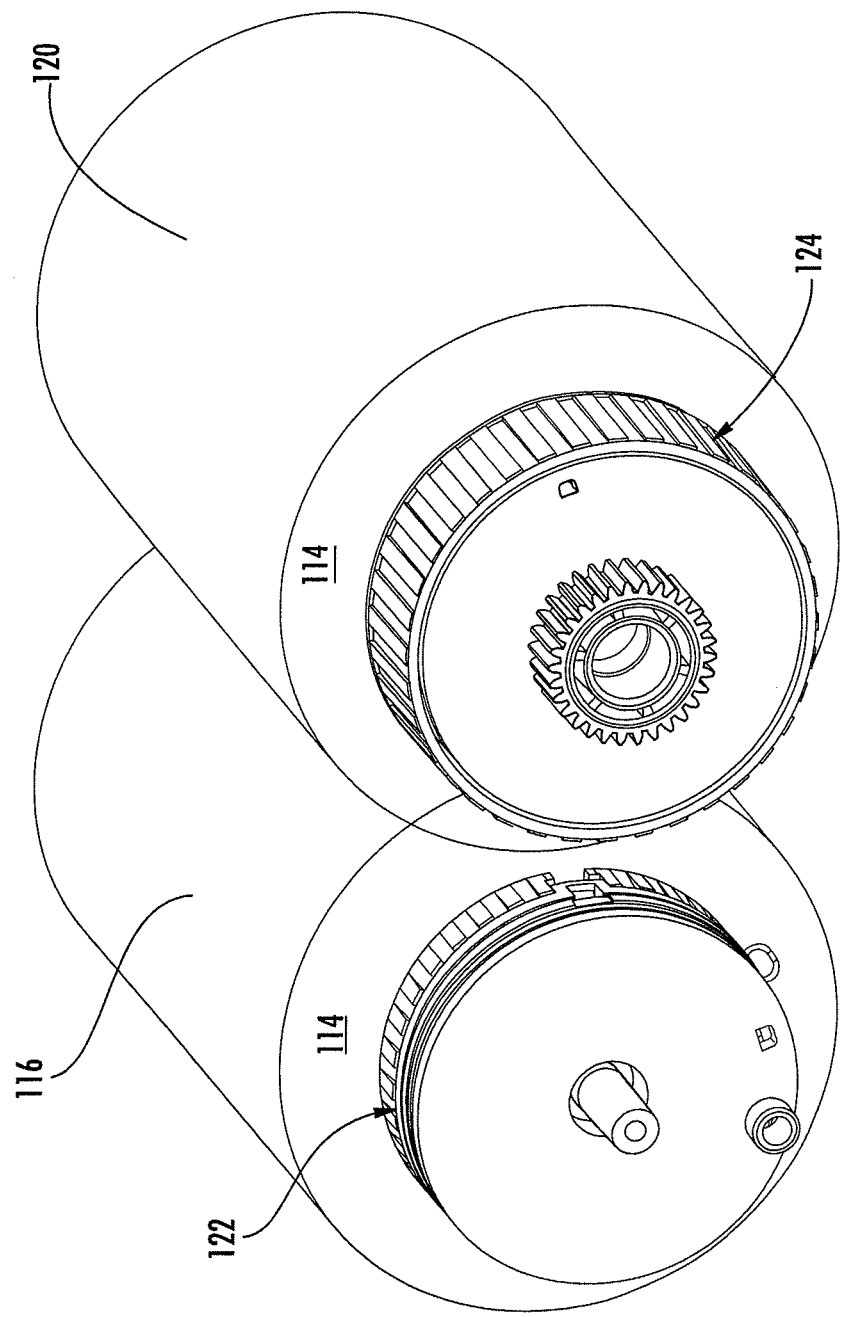
FIG. 5 illustrates ribbon supply and take-up clutch assemblies structured in accordance with embodiments of the invention, and ribbon supply and take-up spools, each originally shown proximate detail circle 5 of FIG. 2 but shown in FIG. 5 as removed from the printer for illustration purposes.

FIG. 5 is a detail view of ribbon supply and take-up clutch assemblies 122, 124 and ribbon supply and take-up spools 116, 120 structured in accordance with other embodiments. The depicted ribbon supply clutch assembly 122 and ribbon take-up clutch assembly 124 are configured to improve and control movement of the ribbon 114 to enhance print quality. The depicted ribbon supply clutch 122 engages the ribbon supply spool 116 and the ribbon take-up clutch 124 engages the ribbon take-up spool 120. Although operation of the ribbon supply and take-up clutch assemblies 122, 124 are described herein, further features and examples of the operation of clutch assemblies are provided in U.S. Pat. No. 6,637,957, which was issued on Oct. 28, 2003 and is commonly assigned to the present Applicant, i.e., ZIH Corp. U.S. Pat. No. 6,637,957 is hereby incorporated by reference in its entirety.

As will be described in detail below with respect to FIGS. 6 and 7, the ribbon supply clutch assembly 122 and the ribbon take-up clutch assembly 124 each comprise first 150, 1150 and second 158, 1158 spool engagement members, first 152, 1152 and second 160, 1160 friction members, a biasing assembly 162, 1162, a coupler 166, 1166, and a spring 168, 1168 or other biasing element.

Figure 6:
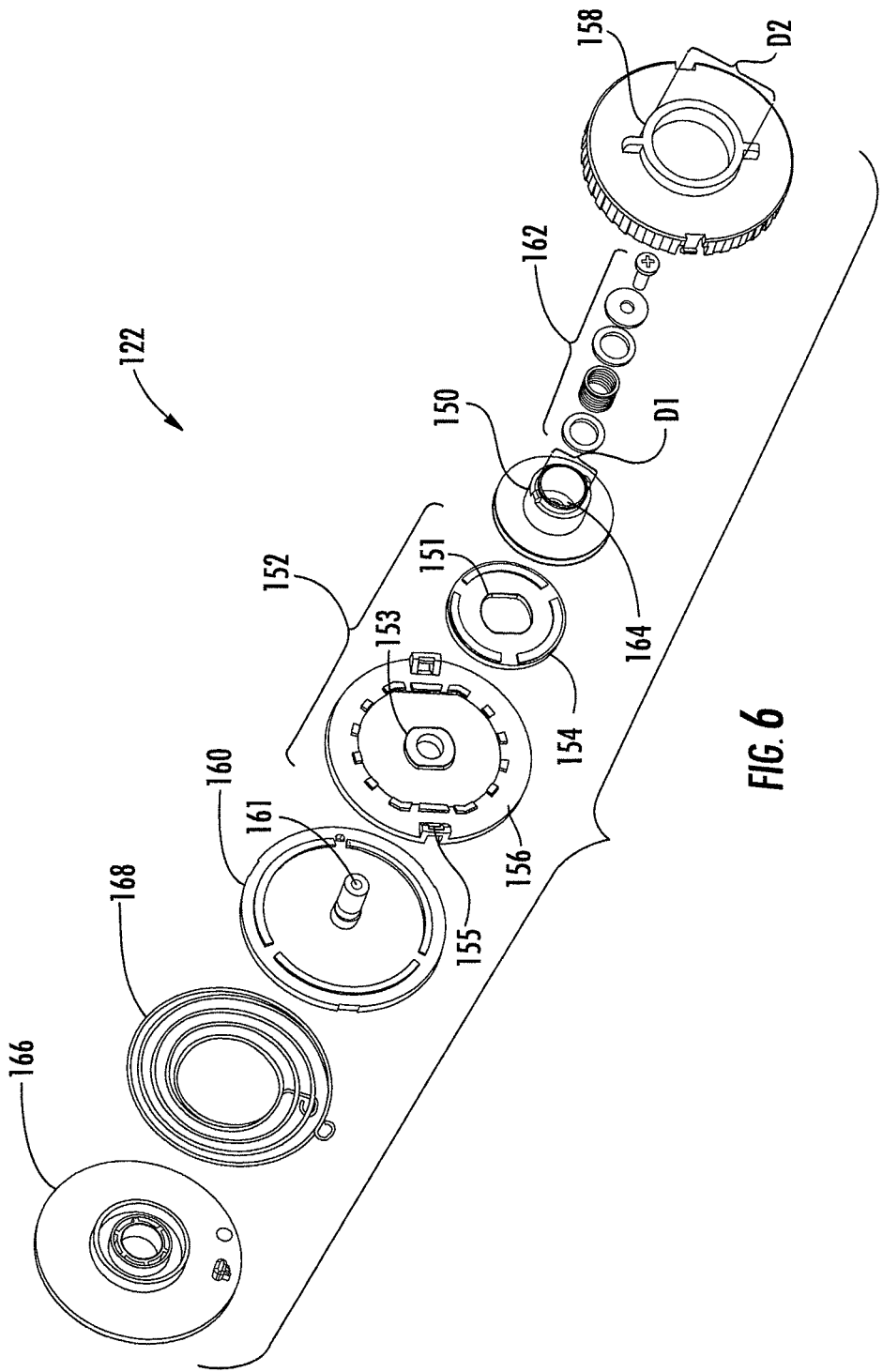
FIG. 6 illustrates an exploded view of the ribbon supply clutch assembly of FIG. 5.

Turning specifically to FIG. 6, the first spool engagement member 150 of the depicted ribbon supply clutch assembly 122 defines a first friction torque, and defines a first diameter D1. The first spool engagement member 150 may be configured to engage a ribbon spool having a diameter that corresponds to the first diameter D1 of the first spool engagement member 150. In one embodiment, the second spool engagement member 158 of the ribbon supply clutch assembly 122 may define a second friction torque and may define a second diameter D2, where the second friction torque is different than the first friction torque and where the second diameter is different than the first diameter. The second spool engagement member 158 may thus be configured to engage a ribbon spool having a diameter that corresponds to the second diameter D2 of the second spool engagement member 158. In this regard, as discussed in greater detail below, the ribbon supply clutch assembly 122 and the ribbon take-up clutch assembly 124 may each be configured to engage ribbon spools of two differing diameters. The friction torque may be impacted by the diameter of the ribbon spool, but may also be impacted by the material and surface finish of the material contained on the ribbon spool. For example, materials with a high coefficient of friction on their surface may require a higher friction torque to dispense material from the spool.

In one embodiment, the first spool engagement member 150 is positioned adjacent the first friction member 152. The depicted first friction member 152 comprises a friction plate 154 for frictionally engaging the first spool engagement member 150 and a coupling plate 156 keyed (i.e., mechanically interlocked as by the depicted key 153 and cavity 151 structures) thereto. In other embodiments, the first friction member 152 may be one integrally formed part.

The depicted first friction member 152 is configured to couple to the second spool engagement member 158 via fasteners 155 (e.g., flanges or tabs) defined in the coupling plate 156 as shown. The depicted second friction member 160 is configured to frictionally engage the first friction member 152, i.e., the coupling plate 156 of the first friction member, to thereby indirectly frictionally engage the second spool engagement member 158 therethrough.

Frictional engagement of the various clutch assembly components may be assisted by a biasing assembly 162 that is configured to bias the first spool engagement member 150 into contact with the first friction member 152 (i.e., the friction plate 154) and further configured to bias the first friction member 152 (i.e., the coupling plate 156) into contact with the second friction member 160. In one embodiment, the first spool engagement member 150 may comprise a lip 164 that the biasing assembly 162 seats against (perhaps through the use of a gasket or washer) in order to bias the first spool engagement member 150 into contact with the first friction member 152 (i.e., the friction plate 154) and further configured to bias the first friction member 152 (i.e., the coupling plate 156) into contact with the second friction member 160. The biasing assembly 162 may include a fastener (i.e., a screw as shown) that is adapted to engage and retain the second friction member 160 via, for example, a threaded hole defined by hub 161.

Figure 7:
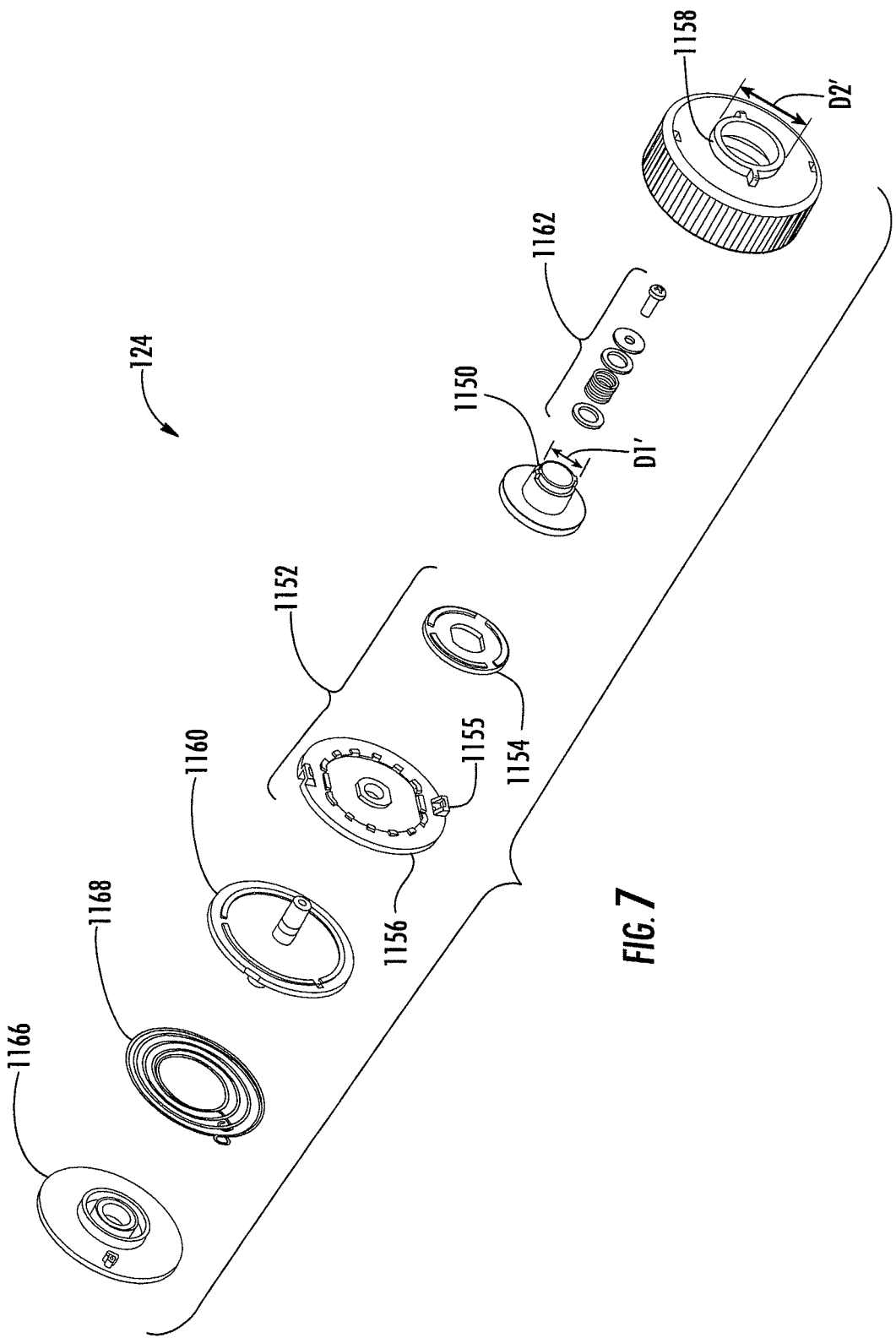
FIG. 7 illustrates an exploded view of the ribbon take-up clutch assembly of FIG. 5.

The above mentioned features may be (though they need not necessarily have to be) common to both the ribbon supply clutch assembly 122 and the ribbon take-up clutch assembly 124 as illustrated in FIGS. 6 and 7. However, the ribbon supply clutch 122 may function in a slightly different manner than the take-up clutch assembly 124 to better facilitate paying out of the ribbon 114. In this regard, as illustrated in FIG. 6, the first friction member 152 may be configured to rotate when the first spool engagement member 150 or the second spool engagement member 158 rotates as ribbon 114 is pulled (i.e., via the driven take-up spool) from the ribbon supply spool 116. For example, the first friction member 152 (i.e., the friction plate 154) may rotate via frictional engagement with the first spool engagement member 150. By way of further example, the first friction member 152 (i.e., the coupling plate 156) may be configured to rotate when the second spool engagement member 158 rotates via the coupling therebetween. Further, the first friction member 152 (i.e., the coupling plate 156) may be configured to rotate the second friction member 160 via frictional engagement therebetween. Accordingly, when the ribbon supply spool 116 imparts rotary motion to either of the first spool engagement member 150 or the second spool engagement member 158, this motion may be transferred to the first friction member 152 and the second friction member 160.

The ribbon supply clutch assembly 122 may further comprise a coupler 166 configured to couple to the second friction member 160 through a biasing element such as a spring 168. The spring 168 may comprise a torsion spring in some embodiments. Further, the coupler 166 may be configured to couple to or be supported by a stationary member such as, for example, the base structure 104. Rotation of the second friction member 160 may be configured to rotate the spring 168 via coupling there between, and the spring may be configured to resist movement of the second friction member via the coupling to the stationary member (i.e., the base structure 104) through the coupler 166. Accordingly, motion imparted to the first spool engagement member 150 or the second spool engagement member 158 by the ribbon 114 being pulled or drawn from the ribbon supply spool 116 may be subjected to resistance created by frictional engagement between the first friction member 152 and the first spool engagement member 150 and/or frictional engagement between the second spool engagement member 158 and the second friction member 160. Further, the spring 168 may operate to gradually increase the resistance force directed counter to the rotation until slippage of the first friction member 152 and/or second friction member 160 occurs. In this way, ribbon may be drawn from supply spool at a smooth and gradually increasing tension rather than at an abrupt, jerky, and inconsistent tension. In addition, consistency in the tension between the supply spool and the take-up spool may be maintained regardless of whether the spools are large or small. Further, when media is reversed within along media feed path 150, the torsion spring 168 may function to maintain tension across the ribbon web.

Turning now to FIG. 7, an embodiment of the ribbon take-up clutch assembly 124 configured to take-up the ribbon 114 with the ribbon take-up spool 120 is illustrated. As noted above, many of the components of the take-up clutch assembly 124 may be similar to those described above with respect to the supply clutch assembly 122, and hence these components will not be discussed in detail. However, the ribbon take-up clutch assembly 124 may further comprise a driven member 170 (see, e.g. FIG. 2) configured to rotationally engage a drive assembly 172 (see, e.g. FIG. 8) and further configured to engage the coupler 1166. For example, in the illustrated embodiment, the driven member 170 (not shown in FIG. 7) comprises a gear that is integral with the coupler 1166. However, in other embodiments the driven member 170 may otherwise be coupled or attached to the coupler 1166.

Thus, rather than receiving motion from a driven ribbon spool, the take-up clutch assembly 124 may be configured to receive rotary motion from the drive assembly 172 through the driven member 170. Accordingly, the coupler 1166 may rotate. Instead of engaging the second friction member 1160 directly, the coupler 1166 may in some embodiments indirectly engage the second friction member 1160. For example, the coupler 1166 may engage a spring 1168 that is coupled to the second friction member 1160. The spring 1168 may comprise a torsion spring in some embodiments. Thereby, rotation of the coupler 1166 may transfer rotary force to the second friction member 1160 through the spring 1168, which may in turn transfer rotary force to the first friction member 1152 (i.e., the coupling plate 1156).

Thus, rotation of the first friction member 1152 may be configured to cause the first spool engagement member 1150 to rotate via frictional engagement with the friction plate 1154. Further, rotation of the first friction member 1152 may be configured to rotate the second spool engagement member 1158 via coupling through the coupling plate 1156. Accordingly, both the first spool engagement member 1150 and the second spool engagement member may be rotated so as to pull the ribbon 114 from the ribbon supply spool 116 and receive the ribbon at the ribbon take-up spool 120. The above-described frictional engagements may allow for some slippage within the take-up clutch assembly 124 and further the spring 1168 may create a biasing force that increases when the driven member 170 is driven so as to reduce abrupt changes in force on the ribbon 114 (i.e., to reduce or eliminate spikes or abrupt changes in the tension of the ribbon or the rotational speed supply or take-up cores). Further, the spring 1168 may function to maintain tension on the ribbon 114 when the take-up clutch assembly 124 is not being driven, which can be helpful for preventing previously wound ribbon for backing off its core.

As discussed above, in one or both of the ribbon supply clutch assembly 122 and the ribbon take-up clutch assembly 124, the second spool engagement member 158, 1158 may define a second diameter D2, D2' that is different from the first diameter D1, D1' of the first spool engagement member 150, 1150. In the depicted embodiments, the second spool engagement member 158, 1158 defines a second diameter D2, D2' that is larger than the first diameter D1, D1' of the first spool engagement member 150, 1150. Accordingly, in one embodiment the second spool engagement member 158, 1158 may be configured to engage a ribbon core approximately of the second diameter D2, D2', and the first spool engagement member 150, 1150 may be configured to engage a ribbon core approximately of the first diameter D1, D1'. Thus, the ribbon supply clutch assembly 122 and the ribbon take-up clutch assembly 124 may be configured to engage ribbon cores of both the first diameter D1, D1' and the second diameter D2, D2', and hence the printer 100 may be configured to receive different diameters of ribbon cores. Similarly, in one or both of the ribbon supply clutch assembly 122 and the ribbon take-up clutch assembly 124, the second spool engagement member 158, 1158 may define a second friction torque that is different from the first friction torque of the first spool engagement member 150, 1150. In the depicted embodiments, the second spool engagement member 158, 1158 defines a second friction torque that is larger than the first friction torque of the first spool engagement member 150, 1150. Accordingly, in one embodiment the second spool engagement member 158, 1158 may be configured to engage a ribbon core that requires a second friction torque, and the first spool engagement member 150, 1150 may be configured to engage a ribbon core that requires a first friction torque. Thus, the ribbon supply clutch assembly 122 and the ribbon take-up clutch assembly 124 may be configured to engage ribbon cores of both the first friction torque and the second friction torque, and hence the printer 100 may be configured to receive different ribbon spools requiring different friction torques for dispensing of the ribbon.

Figure 7B:
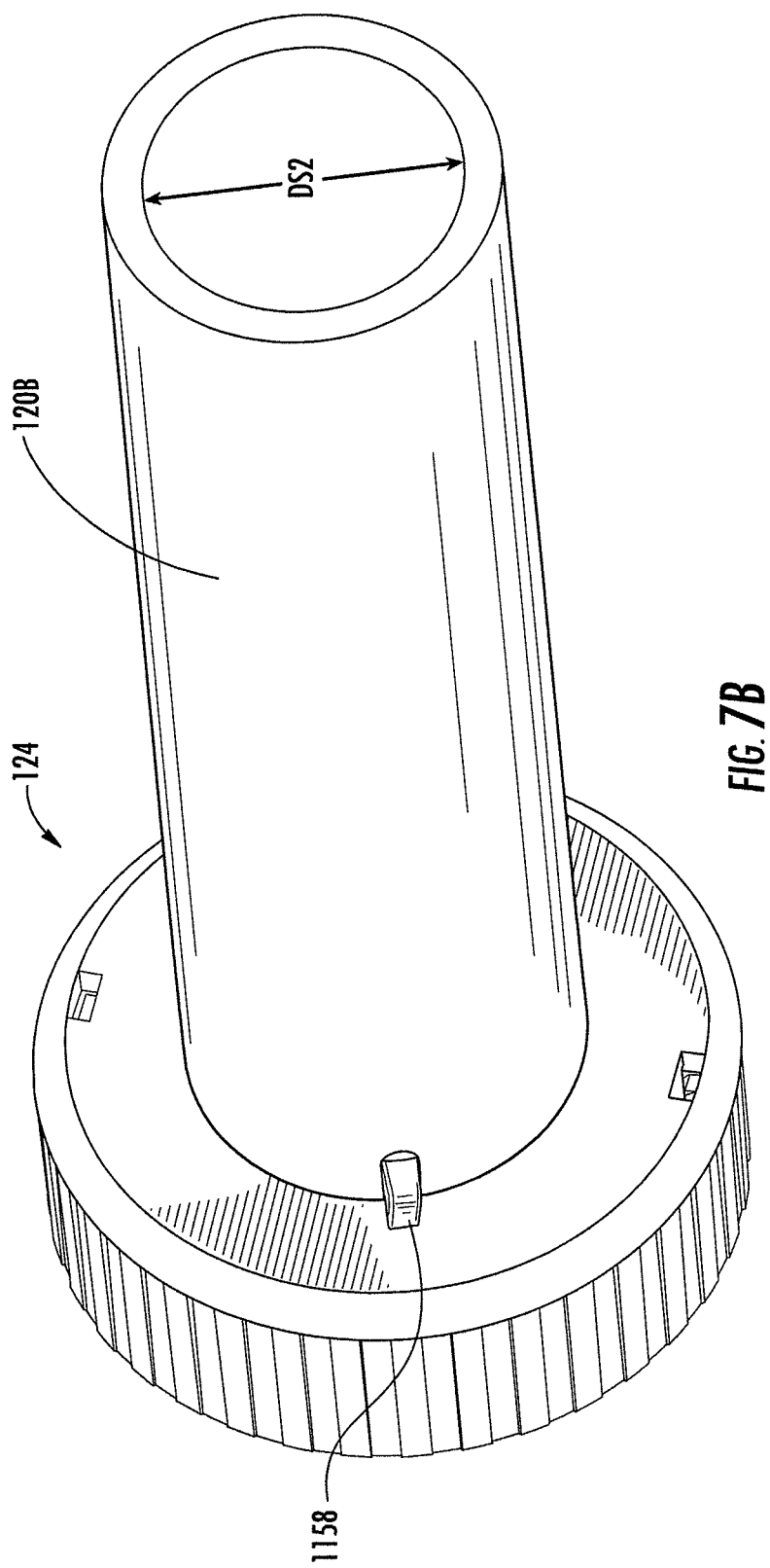
FIG. 7B illustrates a perspective view of the ribbon take-up clutch of FIG. 7A with a ribbon take-up core attached to a second spool engagement member according to an embodiment of the invention.

In this regard, FIGS. 7A and 7B illustrate the ribbon take-up clutch assembly 124 engaging ribbon take-up cores 120A, 120B on which the ribbon 114 may be collected to form the ribbon take-up spool 120. In FIG. 7A the take-up clutch assembly 124 is depicted engaging a ribbon take-up core 120A with the first spool engagement member 1150. The ribbon take-up core 120A may define a diameter DS1 that is substantially the same as the diameter D1' of the first spool engagement member 1150. Conversely, as illustrated in FIG. 7B, the take-up spool assembly 124 may be configured to engage a ribbon take-up core 120B with a relatively larger diameter DS2 than the diameter DS1 of a ribbon take-up core 120A that is engaged by the first spool engagement member 1150. Thus, the ribbon take-up core 120B may engage the second spool engagement member 1158. The ribbon take-up core 120B may define a diameter DS2 that is substantially the same as the diameter D2' of the second spool engagement member 1158. Note that the ribbon supply clutch assembly 122 may in some embodiments engage a relatively smaller ribbon supply spool and a relatively larger ribbon supply spool in substantially the same manner as depicted in FIGS. 7A and 7B.

Clutch Locking Mechanism

Figure 8:
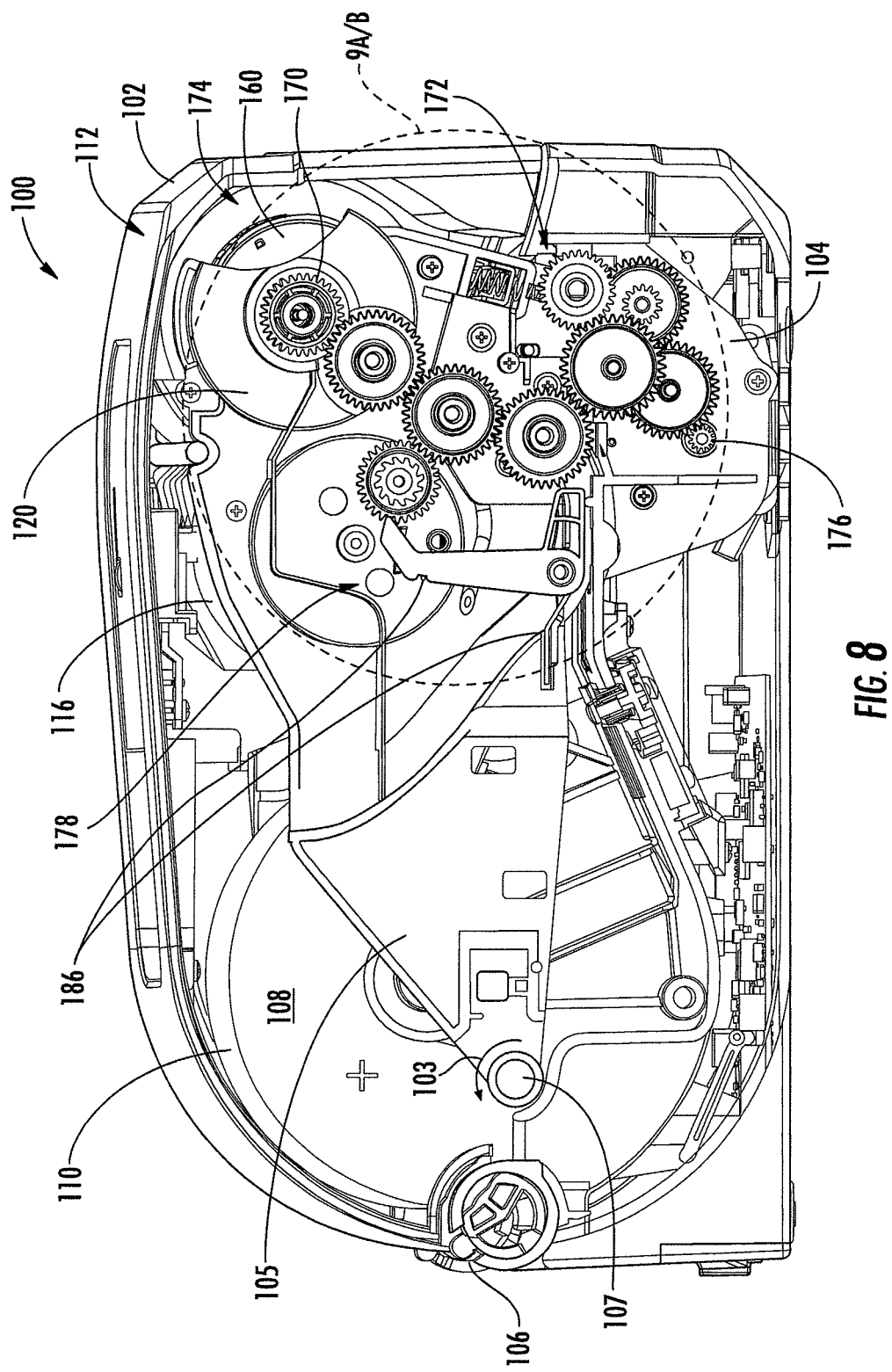
FIG. 8 illustrates a sectional view of a printer ribbon transport assembly according to one embodiment of the invention, taken along section line 8-8 of FIG. 1.

FIG. 8 depicts a printer ribbon transport assembly 112 structured in accordance with another embodiment. The depicted printer ribbon transport assembly 112 comprises a ribbon supply spool 116, a ribbon supply clutch assembly (not shown), a drive assembly 172, a take-up spool assembly 174, and a rotation lock mechanism 178. The drive assembly 172 comprises a plurality of gears including a pinion gear 176 that is driven by a motor (not shown). The depicted take-up spool assembly 174 comprises a ribbon take-up spool 120 and a ribbon take-up clutch assembly (not shown).

Figure 9A:
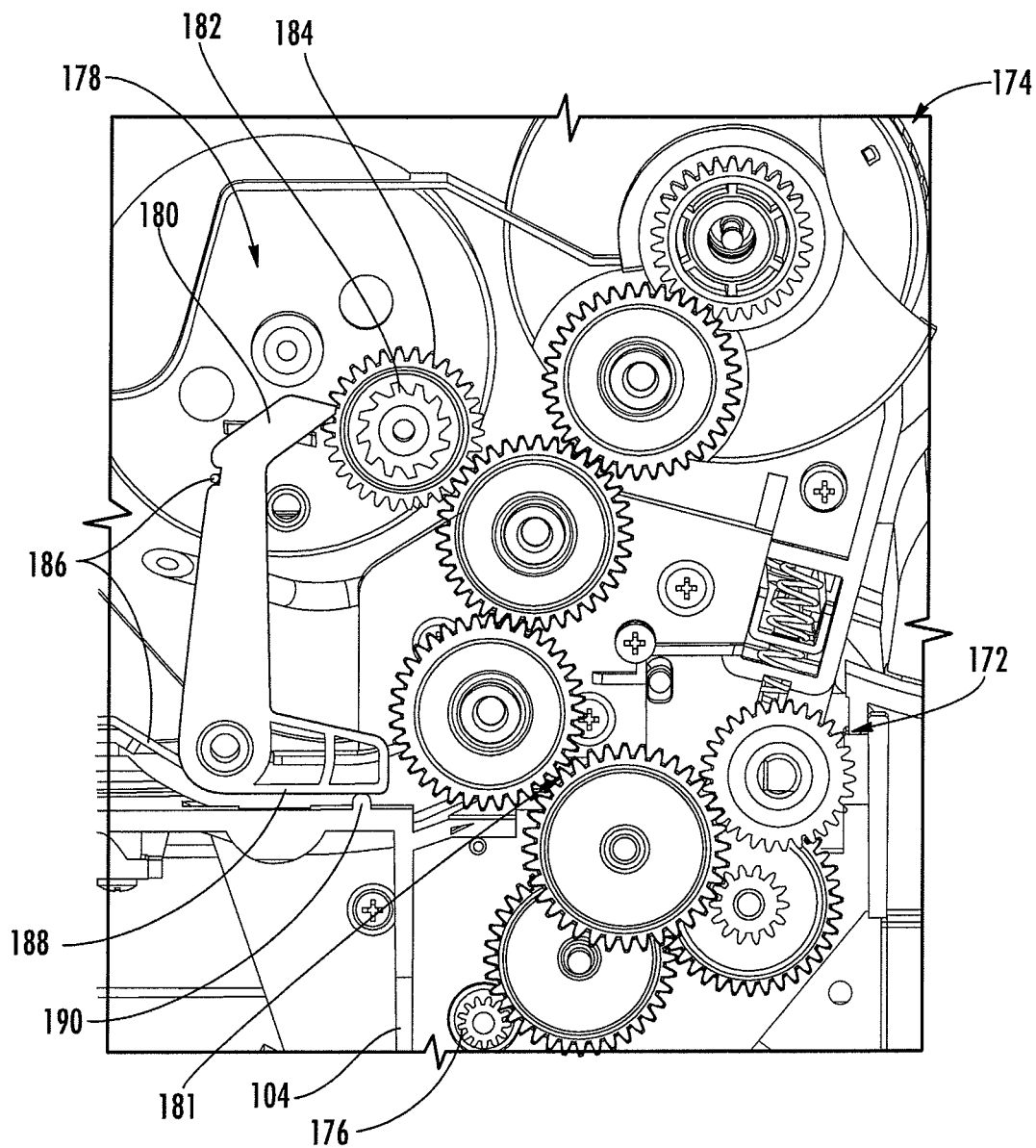
FIG. 9A illustrates a detail view of the printer ribbon transport assembly according to one embodiment of the invention, taken along detail circle 9AB of FIG. 8 and illustrated with the lid is in a closed configuration.

Turning to FIG. 9A, which is a detail view taken along detail circle 9AB of FIG. 8, the depicted rotation lock mechanism 178 comprises a pawl 180, a toothed wheel 182 configured to be engaged by the pawl, a spring 186 (or other biasing element), and a lever arm 188, as will be described below.

The drive assembly 172 may be configured to drive the take-up spool assembly 174 so as to rotate the ribbon take-up spool 120 in a first direction when the take-up spool assembly is disposed in an engaged position, as illustrated. However, the take-up spool assembly 174 may be configurable from the engaged position (see, e.g. FIG. 9A) to a disengaged position (see, e.g. FIG. 9B). In the disengaged position, the take-up spool assembly 174 may at least partially decouple from the drive assembly 172, for example at gap 181'.

When the take-up spool assembly 174 is disposed in the disengaged position, tension in the ribbon 114 may be lost. For example, torsion in the spring 1168 of the take-up clutch assembly 124, which biases the ribbon take-up spool 120 in the first direction, may be lost because the driven member 170 of the take-up clutch assembly may no longer be rotationally coupled through the gears to the motor pinion gear 176 of the drive assembly 172.

Figure 9B:
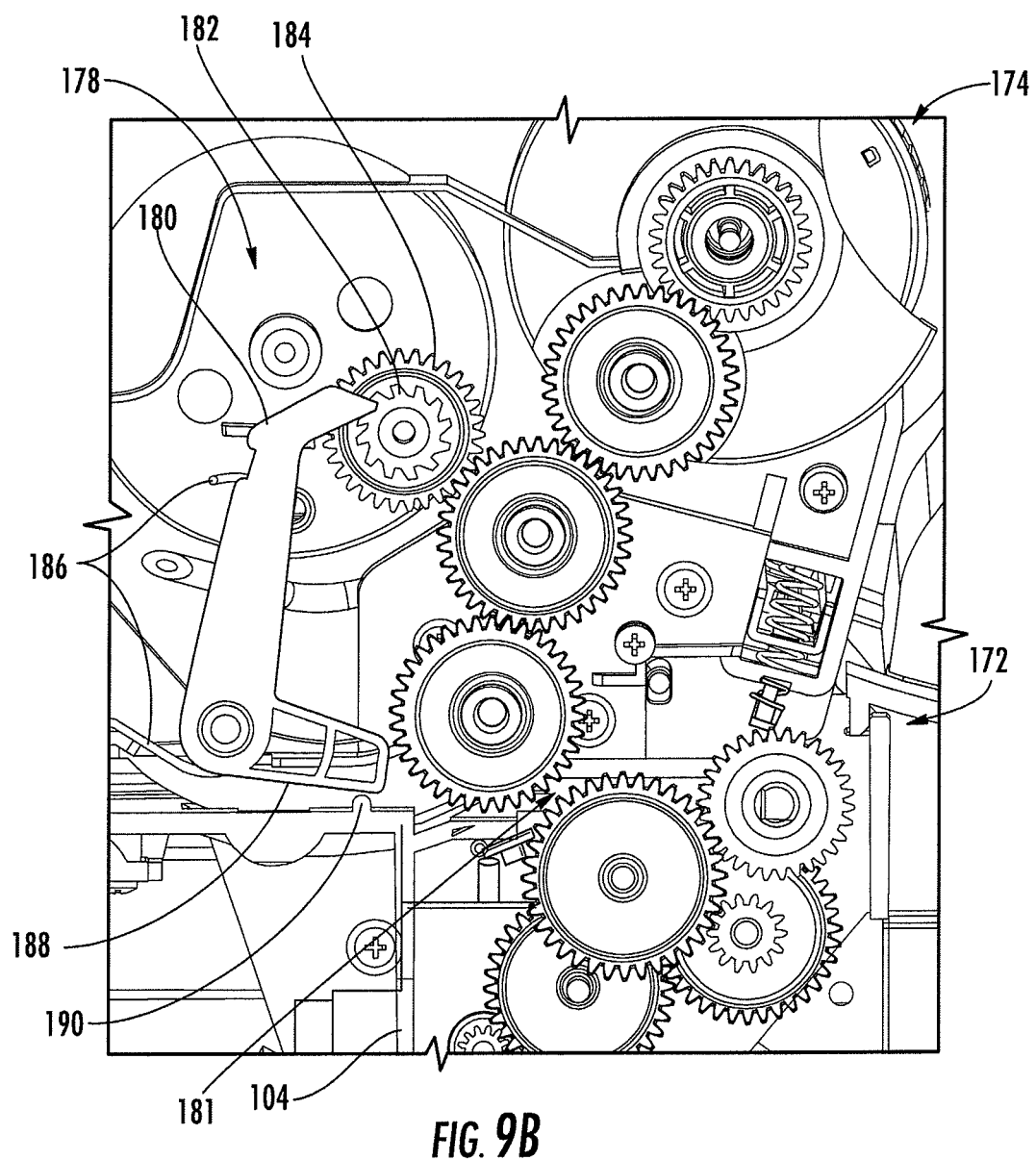
FIG. 9B illustrates a detail view of the printer ribbon transport assembly of FIG. 8, taken along detail circle 9AB and illustrated with the lid in an open configuration.

The ribbon take-up spool 120, the ribbon supply spool, and the gears configured to engage the ribbon take-up spool drive may be attached to a frame member 105 which is configured to move between an engaged position and a disengaged position. The frame member 105 of the illustrated embodiment of FIG. 8 is pivotable about pivot-point 107, in the direction of arrow 103. FIG. 8 illustrates the frame member 105 in the engaged position with the driven member 170 of the take-up spool engaged with the drive assembly 172 via a gear train. When the frame member 105 is moved along arrow 103 towards the disengaged position, the gear train that engages the driven member 170 of the take-up spool may be disengaged from the drive assembly 172, as illustrated in FIG. 9B. As illustrated, the drive assembly 172 is disposed on the base member 104 such that upon frame member 105 pivoting along arrow 103, the drive assembly 172 is disengaged from the gear train driving that is engaged with the ribbon take-up spool. The frame member 105 may be configured to be biased toward the disengaged position such that upon opening of the lid 102, the frame member 105 moves to the disengaged position. The lid 102 may include a latch which secures the lid 102 in the closed position relative to the base 104 such that the frame member 105 becomes secured in the engaged position when the lid 102 is closed. Thus, when the lid 102 is opened, the take-up spool assembly 174 may be moved to the disengaged position as the gears of the take-up spool assembly 174 disengage from the gears of the drive assembly 172.

In order to prevent a partial or total loss of tension in the ribbon 114, the printer ribbon transport assembly 112 may further comprise the rotation lock mechanism 178, as illustrated in FIGS. 9A and 9B. The rotation lock mechanism 178 may include, in one embodiment, a ratchet assembly including a pawl 180 and a toothed wheel 182, a spring 186, and a lever arm 188. In some embodiments at least part of the rotation lock mechanism 178 may be mounted to the lid 102 so as to travel with the take-up spool assembly 174 when the lid 102 is lifted. The rotation lock mechanism 178 may be configured to prevent rotation of the take-up spool 120 in a second direction, which is opposite to the first direction, when the take-up spool assembly 174 is disposed in the disengaged position.

In FIG. 9A, the gears of the take-up spool assembly 174 are depicted as being engaged with the gears of the drive assembly 172 at position 181. However, FIG. 9B depicts the take-up spool assembly 174 in the disengaged position. As illustrated in FIG. 9B, when the gears of the take-up spool assembly 174 disengaged from the gears of the drive assembly 172, the pawl 180 may be configured to engage the toothed wheel 182, which may be rotationally connected to the take-up spool assembly. In particular, the toothed wheel 182 may engage a gear 184 of the take-up spool assembly 174, although in other embodiments the pawl 180 may engage a gear of the take-up spool assembly directly rather than engaging the toothed wheel.

A spring 186 may be configured to bias the pawl 180 to engage the toothed wheel 182 when the take-up spool assembly 174 is in the disengaged position. For example, the rotation lock mechanism 178 may further comprise a lever arm 188 coupled to the pawl 180 and configured to cause the pawl to disengage from the toothed wheel 182 when the take-up spool assembly 174 is in the engaged position. In one embodiment, the printer 100 may further comprise a lever engagement surface 190, wherein the lever arm 188 is configured to engage the lever engagement surface 190 when the take-up spool assembly 174 is in the engaged position. In some embodiments, the base structure 104 may define the lever engagement surface 190. In the depicted embodiment, the lever arm 180 is configured to release from the lever engagement surface 190 when the lid 102 is opened to thereby cause the pawl 180 to engage the toothed wheel 182 as the take-up spool assembly 174 is configured to the disengaged position. Accordingly, when the lid 102 is opened, the rotation lock mechanism 178 may prevent rotation of the take-up spool 120 and tension may thereby be maintained in the ribbon 114 even when the lid is opened. The ribbon supply spool 116 may maintain the tension via the frictional force of the clutch mechanism 122 disposed on the ribbon supply spindle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A printhead assembly for use in a printing apparatus, comprising:
   a printhead; and
   a printhead support bracket comprising:
      an opposed ramp surface configured for engagement by a biasing ramp of the printing apparatus; and
      a ribbon peel surface configured to receive a ribbon force;
   wherein the opposed ramp surface is configured to receive a biasing force from the biasing ramp, wherein the biasing force at least partially counteracts the ribbon force.

2. The printhead assembly of claim 1, wherein the opposed ramp surface defines an angle between 10 and 25 degrees relative to the printhead support bracket.

3. The printhead assembly of claim 1, wherein the printing apparatus comprises a printhead biasing assembly comprising a biasing element configured to bias the biasing ramp into contact with the opposed ramp surface of the printhead support bracket.

4. The printhead assembly of claim 3, wherein the printhead biasing assembly further comprising a guide member configured to guide the biasing ramp on a guide path.

5. The printhead assembly of claim 4, wherein the guide path is configured to direct the biasing ramp toward a platen.

6. The printhead assembly of claim 3, wherein the biasing ramp comprises a removable wedge.

7. The printhead assembly of claim 3, further comprising a heat sink, wherein the heat sink is coupled between the printhead support bracket and the printhead.

8. The printhead assembly of claim 7, wherein the biasing assembly is configured to bias the heat sink into contact with a stop member.

9. The printhead assembly of claim 8, wherein the stop member is defined by a base structure.

10. The printhead assembly of claim 1, wherein the printhead assembly is a replaceable component of the printing apparatus.

11. A method of aligning a printhead, comprising:
   receiving a ribbon force at a peel surface of a printhead support bracket; and
   generating a biasing force at the printhead support bracket to at least partially counteract the ribbon force;
   wherein the biasing force is directed by a biasing ramp of a biasing assembly engaging an opposed ramp surface of the printhead support bracket.

12. The method of claim 11, wherein the biasing force is directed at an angle between 10 degrees and 25 degrees relative to the printhead support bracket.

13. The method of claim 11, further comprising engaging a stop member with a heat sink coupled to the printhead.

14. The method of claim 11, further comprising maintaining a substantially consistent ribbon force with a first clutch mechanism configured to engage a ribbon supply spool and a second clutch mechanism configured to engage a take-up spool.

15. The method of claim 11, further comprising guiding the biasing ramp on a guide path with a guide member of the biasing assembly.

16. The method of claim 15, further comprising directing the biasing ramp toward a platen with the guide member.

17. A system for printing, comprising:
   a printing apparatus configured to print on media;
   a printhead; and
   a printhead support bracket comprising:
      an opposed ramp surface configured for engagement by a biasing ramp of the printing apparatus; and a ribbon peel surface configured to receive a ribbon force;

wherein the opposed ramp surface is configured to receive a biasing force from the biasing ramp, wherein the biasing force at least partially counteracts the ribbon force, and wherein the printing apparatus comprises a printhead biasing assembly comprising a biasing element configured to bias the biasing ramp into contact with the opposed ramp surface of the printhead support bracket.

18. The printhead assembly of claim 17, wherein the printhead biasing assembly further comprising a guide member configured to guide the biasing ramp on a guide path.

19. The printhead assembly of claim 18, wherein the guide path is configured to direct the biasing ramp toward a platen.

20. The printhead assembly of claim 17, wherein the biasing ramp comprises a removable wedge.

* * * * *